United States Patent [19]

Gawad

[11] Patent Number: 5,025,356
[45] Date of Patent: Jun. 18, 1991

[54] SMALL PROFILE HIGH WATTAGE HORITCULTURAL LUMINAIRE

[75] Inventor: Mahmoud A. Gawad, Montreal, Canada

[73] Assignee: GET Sylvania Canada Ltd, Montreal, Canada

[21] Appl. No.: 388,179

[22] Filed: Jul. 31, 1989

[30] Foreign Application Priority Data

Oct. 7, 1988 [CA] Canada ................................. 579557

[51] Int. Cl.⁵ ............................ F21V 7/12; F21V 7/16
[52] U.S. Cl. ..................................... 362/221; 362/278; 362/281; 362/368; 362/805
[58] Field of Search ............. 362/221, 217, 218, 145, 362/277, 278, 281, 362, 368, 371, 404, 805, 370

[56] References Cited

U.S. PATENT DOCUMENTS

| | | | |
|---|---|---|---|
| 2,313,983 | 3/1943 | Yost et al. | 362/221 |
| 2,314,103 | 3/1943 | Raizner | 362/217 |
| 2,597,875 | 5/1952 | Kruger | 362/217 |
| 3,183,346 | 5/1965 | Spaulding et al. | 362/218 |
| 3,293,426 | 12/1966 | Zeitz et al. | 362/221 |
| 4,419,719 | 12/1983 | Boer et al. | 362/218 |
| 4,464,707 | 8/1984 | Forrest | 362/221 |
| 4,477,863 | 10/1984 | Walz | 362/221 |
| 4,493,012 | 1/1985 | Petersen | 362/221 |

FOREIGN PATENT DOCUMENTS

| | | | |
|---|---|---|---|
| 549332 | 4/1932 | Fed. Rep. of Germany | 362/320 |
| 169489 | 5/1934 | Switzerland | 362/217 |
| 771471 | 4/1957 | United Kingdom | 362/221 |

Primary Examiner—Ira S. Lazarus
Assistant Examiner—Richard R. Cole
Attorney, Agent, or Firm—Joseph S. Romanow

[57] ABSTRACT

A horticultural luminaire in which a lamp is contained within a first compartment and a ballast unit is contained in a second compartment. The ballast unit is in heat-conducting contact with the top of the unit and a plate member also covers the ballast unit to act as an additional heat sink. The top of the luminaire housing may be provided with bracket members to facilitate mounting of the luminaire on a structural I-beam.

5 Claims, 2 Drawing Sheets

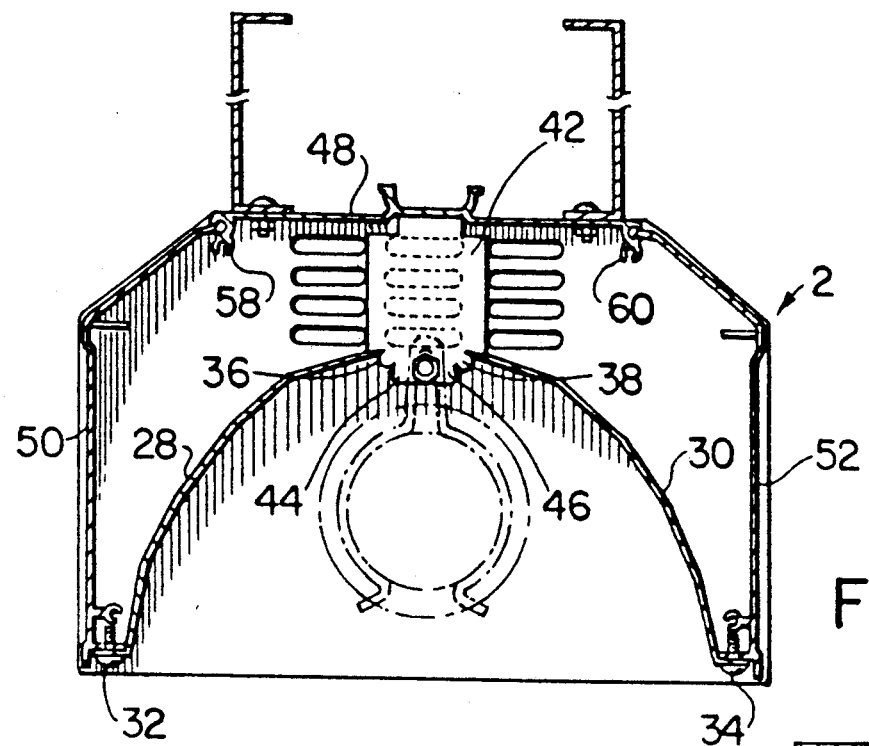
FIG. 1
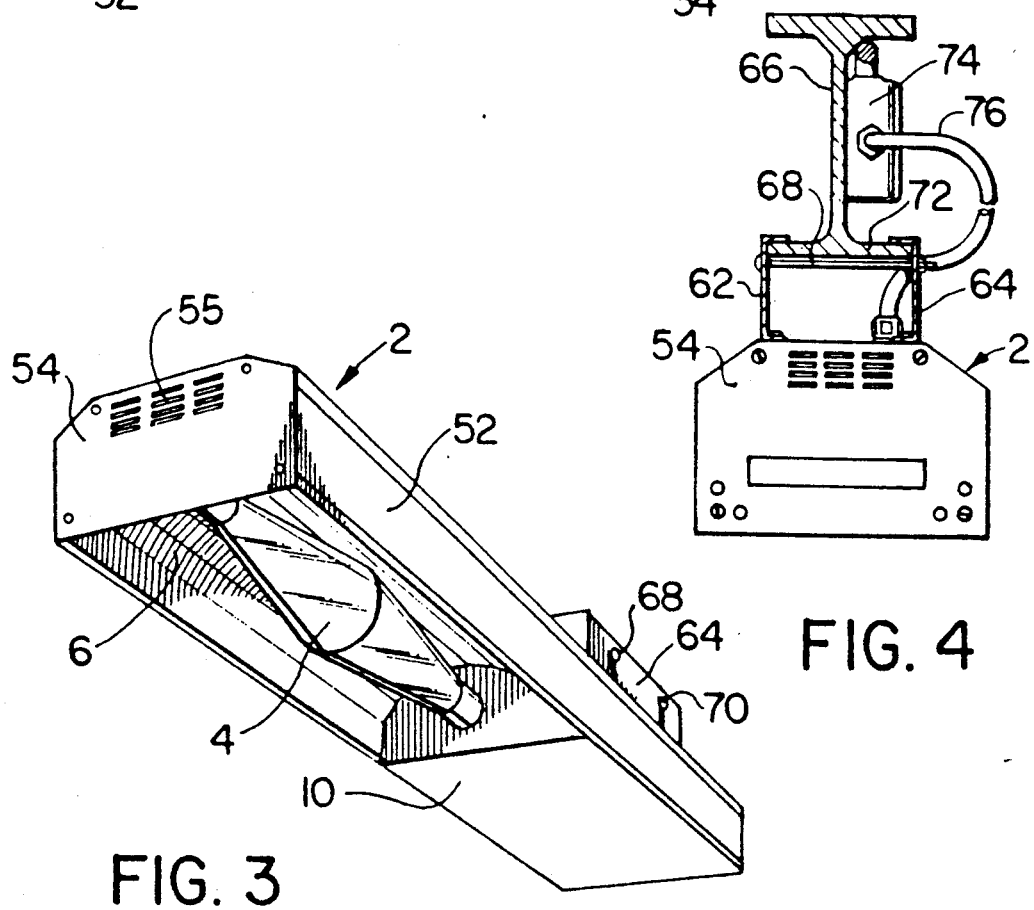
FIG. 3
FIG. 4

SMALL PROFILE HIGH WATTAGE HORITCULTURAL LUMINAIRE

CROSS REFERENCES TO RELATED APPLICATIONS

Ser. No. 07/388,215, filed concurrently herewith, and assigned to the assignee hereof, being a design patent application, contains related subject matter.

TECHNICAL FIELD

This invention relates to luminaires or light fixtures, particularly suited for horticultural uses.

BACKGROUND ART

Horticultural luminaires normally use high wattage lamps (1000 W HPS) and in prior art arrangements the ballast and starter is mounted close to the lamp for starting purposes. The ballast normally requires a large housing to dissipate the heat and a large cavity is required for the lamp to provide the required light distribution. Fixtures having a width exceeding 20 inches are very common; and it has been found that wide luminaires obstruct daylight which is undesirable for horticultural applications.

DISCLOSURE OF THE INVENTION

It is an object of the invention to provide a luminaire wherein less obstruction to daylight is encountered.

According to the present invention there is Provided a luminaire comprising a housing for containing a lamp in a first compartment and having an open underside; a first plate member defining one end of the first compartment, a socket for the lamp being mounted on one side of the first plate member; a second plate member on the other side of the first plate member and spaced therefrom to form a second compartment; a ballast unit for the lamp in the second compartment and making heat-conductive contact with the housing and a third plate member covering the open underside portion of the second compartment, the third plate member making heat-conductive contact with the ballast unit.

According to another aspect there is provided a luminaire housing, a pair of bracket members mounted on top of the luminaire housing, and at least one bolt member adapted to pass through the brackets to lock the luminaire housing in a desired location on a structural I-beam, the bracket members engaging a lip of the I-beam on opposite sides thereof.

An embodiment of the invention will now be described, by way of example, with reference to the accompanying drawings.

BRIEF DESCRIPTION OF THE DRAWINGS

FIG. 1 is a diagrammatic cross-sectional view of a horticultural luminaire according to the described embodiment.

FIG. 3 is a perspective view of the luminaire of FIG. 1.

FIG. 4 is an end view of the luminaire shown in FIG. 3 to illustrate how it may be mounted on a structural I-beam.

BEST MODE FOR CARRYING OUT THE INVENTION

Figure 2:
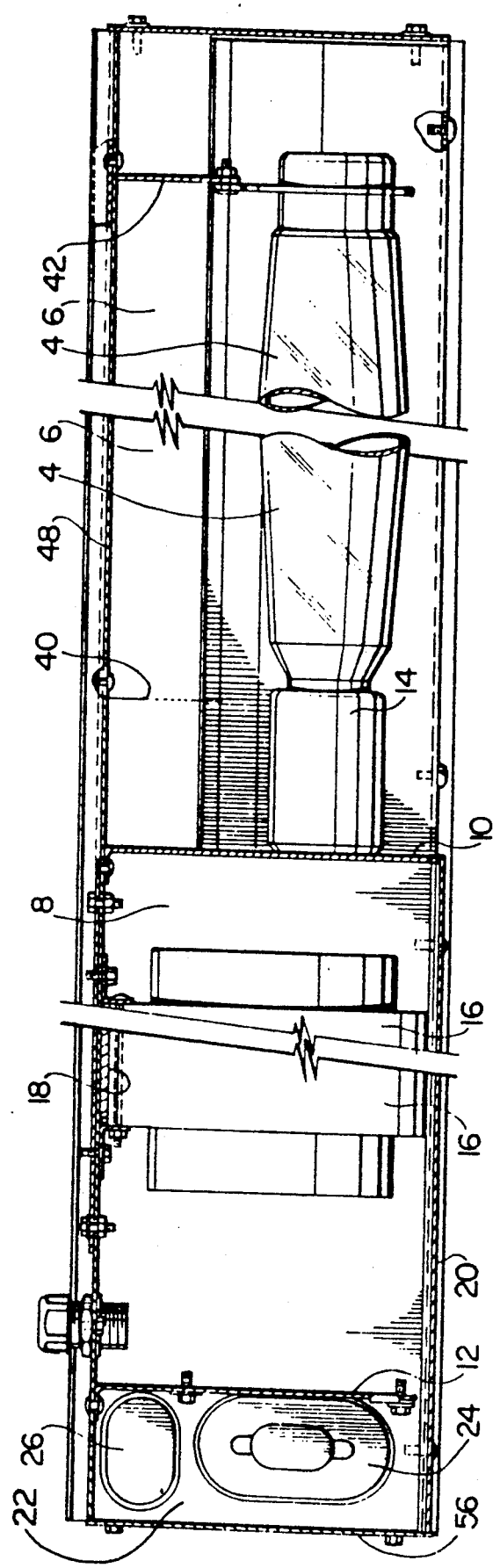
FIG. 2 is a diagrammatic cross-sectional side view of the luminaire of FIG. 1.

Referring to the figures, a horticultural luminaire housing 2 contains a high wattage (1000 W HPS) lamp 4. The lamp 4 is mounted in a first compartment 6 (FIGS. 2 and 3) while a second compartment 8 is separated from the first compartment 6 by a first partitioning plate member 10. The other extremity of the second compartment 8 is defined by a second identical plate member 12 as can be seen in FIG. 2. A socket 14 for lamp 4 is mounted on one side of plate member 10 as shown in FIG. 2.

A ballast unit 16 for lamp 4 is mounted in the second compartment 8 and its top surface makes heat-conductive contact with the ballast unit 16 so as to act as a second heat sink for the ballast unit 16. The plate member 20 also covers a third compartment 22 within housing 2 wherein are located an igniter 24 and a capacitor 26 for lamp 4. The igniter 24 and capacitor 26 are mounted on plate member 12.

The housing 2 includes a reflector which comprises two separate extruded sections 28 and 30 as can be seen in FIG. 1. The bottom of each section is fastened at 32 or 34 to the respective extruded side of the housing 2 while the top of each section rests on a respective protrusion 36 or 38 on stepped support member 40 or 42. An alternate position for the top of each section is on respective protrusion 44 or 46, effectively between protrusions 36 and 44 or 38 and 46 (FIG. 1). Thus angular variations in the reflector position are possible to change the photometric distribution.

The top member 48 of housing 2 was extruded as a single piece to act as a support. However, the sides 50 and 52 may be made as one piece or each may be extruded in two pieces. This separates the lamp compartment from the ballast compartment to permit each reflector section to swing open and close between different positions dependent on the number of mounting holes provided in the end plate 54. The other end plate 56 encloses the compartment containing the igniter 24 and capacitor 26. As will be appreciated, the provision of a plurality of mounting holes in the end plate 54 is effective to multiply the step positions of the reflector relative to the stepped support members 40 and 42, the number of total positions being determined by the number of additional mounting holes in end plate 54.

As will be clear from FIG. 1, the two side extrusions 50 and 52 slide into receiving portions 58 and 60, respectively, of the extruded top member 48. As mentioned above, the ballast unit 16 is mounted in the compartment 8 between the two plate members 10 and 12. It is attached to the extruded top member 48 of the housing 2 so that the top member 48 acts as a heat sink for the ballast unit 16. The plate member 20 covering the bottom of compartment 8 acts as a second heat sink for the ballast unit 16.

Additional ventilation of compartment 8 is Provided by natural convection at a rate which can be varied to suit the particular application of the luminaire. Air may be guided to pass through the openings in the end of the ballast compartment 8 and through the lamp compartment to exit at the other end of the luminaire fixture via vents 55. A small elevation of the mounting (say 5°–30°) will permit a wide range of operating and surface temperatures to be permitted and thus have been found to be a particular feature of the embodiment.

The described luminaire was constructed to provide a 1000 W unit in a package not exceeding 10 inches in width and 7 inches in height with lengths varying from 24–34 inches depending on the required size for a self-contained unit. This was made possible due to the described heat dissipation arrangement for the unit in combination with the adjustable reflector permitting light distribution control. It will be appreciated that as heat dissipation and photometric distribution are important factors in the design of the described high wattage, small sized luminaire, alternate embodiments were successfully tried and resulted in (a) further reduction of the operating temperature, and (b) multiplying the photometric adjustment range.

The reduction of the operating range of the luminaire was achieved by sectioning the extrusions with an overlap to provide air gap separators which reduce or prevent heat conduction between the lamp compartment 6 and the ballast compartment 8. Venting the lamp compartment 6 was found to reduce the temperature even more. The use of forced air circulation provided even further lowering of the temperature where this was desired.

In FIGS. 3 and 4, a method of mounting the luminaire on an I-beam type structure is diagrammatically illustrated. The luminaire housing 2 is provided with bracket members 62 and 64 which can be used to mount the luminaire fixture on, for example, a building's 5 inch structural I-beam 66. The luminaire housing 2 can be maintained in place by the use of two bolt members 68 and 70 with corresponding nuts, which lock the luminaire housing in the desired location and provide quick mounting and adjustability of the luminaire, the bracket members 62 and 64 engaging a lip 72 of the I-beam on opposite sides thereof. Thus ease of installation, positioning and maintenance is achieved. It will be understood that in some situations, only one bolt member may be provided and the electrical receptacle 74 for the lamp may be mounted on the I-beam 66, as shown in FIG. 4, and the electrical cable 76 to lamp 4 may be arranged as shown.

From the above, it will be seen that a high wattage luminaire (1000 W HPS) of minimum width and depth has been described for use in horticultural applications and it incorporates the ability to be quickly mounted to an I-beam, variable photometric distribution and a low operating temperature is possible. However, it will be readily apparent to a person skilled in the art that a number of variations and modifications can be made without departing from the true spirit of the invention which will now be pointed out in the appended claims.

What is claimed is:

1. A luminaire having an adjustable photometric distribution comprising:
    a housing including a first compartment for containing a lamp, said first compartment having an open underside;
    a first plate member mounted on said housing, said first plate member having first and second sides, said first side defining one end of said first compartment, a socket for said lamp being mounted on said first side of said first plate member;
    a second plate member mounted on said housing spaced from said first plate member, said second plate member having first and second sides, there being a second compartment extending from said second side of said first plate member to said first side of said second plate member;
    a ballast unit for said lamp mounted in said second compartment and making heat-conductive contact with said housing;
    a third plate member covering the open underside portion of said second compartment, said third plate member making heat-conductive contact with said ballast unit;
    a reflector for reflecting light from said lamp with an adjustable photometric distribution, said reflector being mounted within said first compartment above the position for said lamp, said reflector comprising two flexible sections, each section having a lower longitudinal edge and an upper longitudinal edge;
    a reflector support member mounted within said first compartment above the position for said lamp, said support member including first support means for supporting the upper longitudinal edge of said first reflector section in a plurality of mounting positions and second reflector support means for supporting the upper longitudinal edge of said second reflector section in a plurality of mounting positions;
    said first reflector section being mounted with its upper longitudinal edge supported in a selected upper mounting position by said first support means and said second reflector section being mounted with its upper longitudinal edge supported in a selected upper mounting position by said second reflector support means such that the shape of said first flexible reflector section is adjusted by its selected upper mounting position, the shape of said second flexible reflector section is adjusted by its selected upper mounting position, and the photometric distribution of said luminaire is adjusted by said upper mounting positions of said first and second reflector sections.

2. A luminaire as described in claim 1 wherein said housing includes third support means for supporting the lower longitudinal edge of said first reflector section in a plurality of mounting positions and fourth reflector support means for supporting the lower longitudinal edge of said second reflector section in a plurality of mounting positions, and said first reflector section is mounted with its lower longitudinal edge supported in a selected lower mounting position by said third support means and said second reflector section is mounted with its lower longitudinal edge supported in a selected lower mounting position by said fourth reflector support means such that the shape of said first flexible reflector section is adjusted by its lower mounting position, the shape of said second flexible reflector section is adjusted by its lower mounting position, and the photometric distribution of said luminaire is adjusted by said lower mounting positions of said first and second reflector sections.

3. A luminaire as described in claim 2 wherein said housing includes an end plate and said third support means includes a first plurality of mounting holes in said end plate and said fourth support means includes a second plurality of mounting holes in said end plate.

4. A luminaire as described in claim 1 wherein an igniter and a capacitor for said lamp are mounted on said second side of said second plate member.

5. A luminaire as described in claim 1 wherein said reflector support member has first and second sides, said first side including said first support means and said second side including said second support means, said first support means comprising a first group of slots and said second support means comprising a second group of slots, each of said slots being formed to receive and support the upper longitudinal edge of one of said reflector sections.

* * * * *

UNITED STATES PATENT AND TRADEMARK OFFICE
CERTIFICATE OF CORRECTION

PATENT NO. : 5,025,356

DATED : June 18, 1991

INVENTOR(S) : Mahmoud A. Gawad

It is certified that error appears in the above-identified patent and that said Letters Patent is hereby corrected as shown below:

Title page: [54] SMALL PROFILE HIGH WATTAGE HORTICULTURAL LUMINAIRE

Title page: [73] Assignee: GTE Sylvania Canada Ltd.

Column 1, line 2, should read --HORTICULTURAL--

Column 1, line 32, should read --provided--

Column 2, line 2, should read --provided--

Signed and Sealed this

First Day of December, 1992

Attest:

DOUGLAS B. COMER

Attesting Officer     Acting Commissioner of Patents and Trademarks